United States Patent [19]

Bledsoe

[11] Patent Number: 4,758,079

[45] Date of Patent: Jul. 19, 1988

[54] EYE SHIELD FOR BLOCKING ULTRAVIOLET RAYS

[76] Inventor: Wanda Bledsoe, Rte. 2, Box 14, Milan, Ind. 47031

[21] Appl. No.: 928,869

[22] Filed: Nov. 10, 1986

[51] Int. Cl.⁴ .............................................. G02C 7/10
[52] U.S. Cl. .......................................... 351/44; 2/15; 446/27; 351/45
[58] Field of Search .................. 351/44, 45, 46, 163; 350/1.6, 1.7; 446/26, 27; 2/15, 433

[56] References Cited

U.S. PATENT DOCUMENTS

| | | | |
|---|---|---|---|
| 1,882,909 | 10/1932 | Rhue | 351/45 |
| 2,345,777 | 10/1941 | Somers . | |
| 2,370,697 | 9/1940 | Tillyer . | |
| 2,914,989 | 12/1959 | Gretener | 350/1.7 |
| 3,069,301 | 12/1962 | Buckley et al. | 350/1.6 |
| 3,267,807 | 8/1966 | Swope . | |
| 3,269,267 | 8/1966 | Collins . | |
| 3,356,439 | 12/1967 | Magnus . | |
| 3,519,339 | 7/1970 | Hutchinson . | |
| 3,591,263 | 7/1971 | Esterson . | |
| 3,885,855 | 5/1975 | Gross | 350/1.6 |

Primary Examiner—Rodney B. Bovernick
Assistant Examiner—Jay P. Ryan
Attorney, Agent, or Firm—Darrell Marquette; Jack C. McGowan

[57] ABSTRACT

An eye shield that effectively blocks ultraviolet rays is incorporated in a pair of ordinary eyeglasses. The eye shield comprises a combination of a coating or layer of light blocking material on the inner surfaces of the eyeglass lenses and a coating or layer of light reflecting material on the outer surfaces of the eyeglass lenses. This combination of light blocking material and light reflecting material results in zero light transmission through the eyeglass lenses.

4 Claims, 1 Drawing Sheet

EYE SHIELD FOR BLOCKING ULTRAVIOLET RAYS

BACKGROUND OF THE INVENTION

This invention relates generally to eye shields and, in particular, to an eye shield that effectively blocks ultraviolet rays.

Many people have found that exposure to sunlight hurts their eyes. Furthermore, excessive exposure to sunlight causes tearing of the eyes and may result in damage to the retinas in addition to other undesireable side effects such as headaches and premature wrinkling of the skin due to squinting of the eyes. These problems are more prevalent in people who sunbathe for extended periods of time. Ordinary sunglasses do not eliminate these problems because they still allow some transmission of ultraviolet rays to the eyes of the wearer.

SUMMARY OF THE INVENTION

It is an object of the present invention to protect a person's eyes by providing an eye shield for effectively blocking the transmission of ultraviolet rays to the person's eyes.

It is another object of the present invention to provide an eye shield that may be used especially by people who sunbathe to prevent tearing of their eyes while also preventing undesirable side effects such as headaches and wrinkling of the skin due to eye squinting.

The present invention accomplishes these objects by providing an eye shield which is adapted for use in a pair of eyeglasses having a pair of lenses disposed to fit over the eyes of a person wearing the eyeglasses. The lenses each have an inner surface and an outer surface. A coating or layer of light blocking material such as black spray paint is applied to the inner surfaces of the lenses, and a coating or layer of light reflecting material such as white spray paint is applied to the outer surfaces of the lenses.

The combination of the coating or layer of light blocking material and the coating or layer of light reflecting material results in zero light transmission through the lenses. Also, the coating or layer of light blocking material encourages a person's eyes to rest while the coating or layer of light reflecting material prevents the lenses of the eyeglasses from heating up and becoming uncomfortable.

DESCRIPTION OF THE INVENTION

Figure 1:
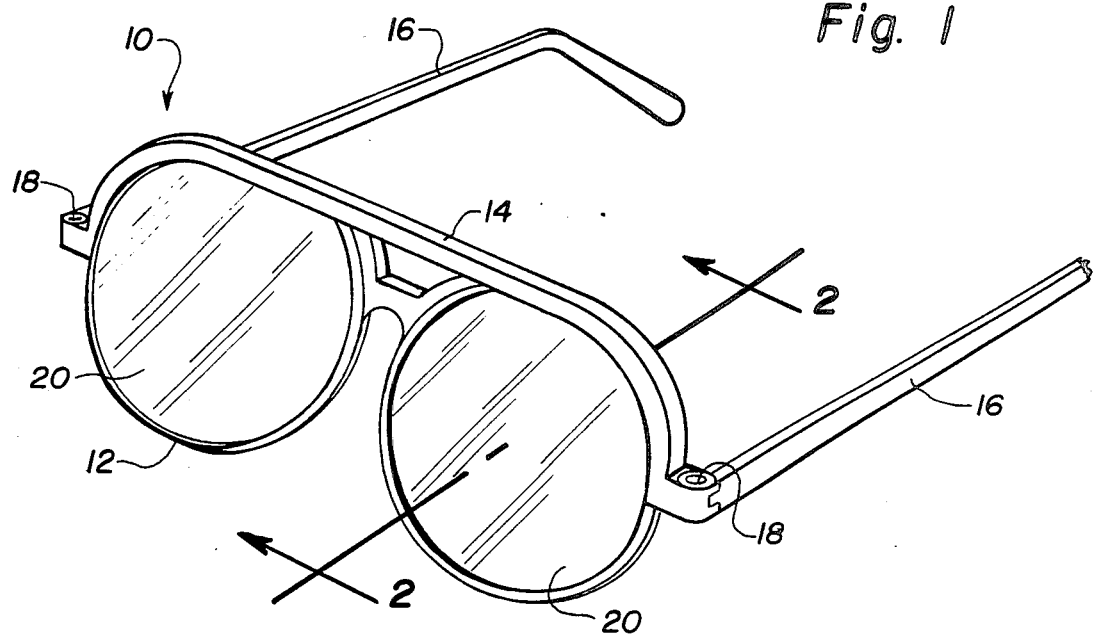
FIG. 1 is a front perspective view of a pair of eyeglasses embodying the eye shield of the present invention.
Figure 2:
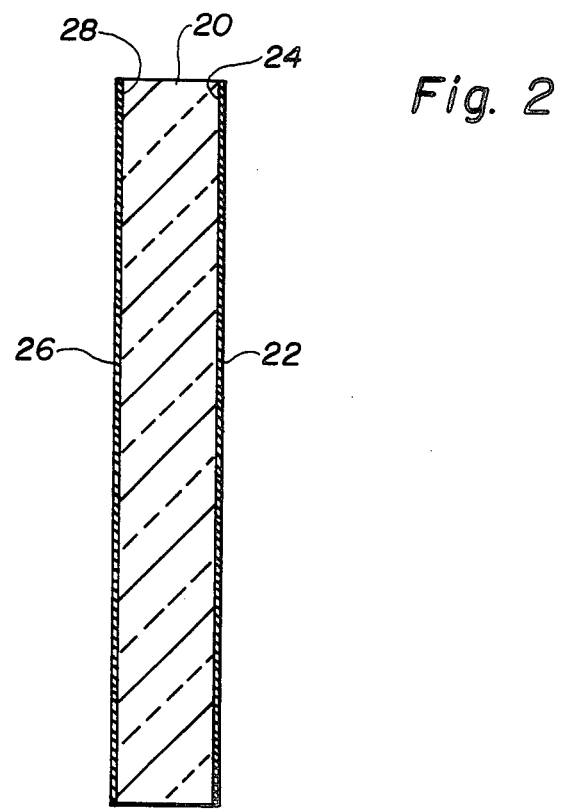
FIG. 2 is an enlarged cross-sectional view taken along lines 2—2 in FIG. 1.

Referring to FIG. 1, an eye shield according to the present invention is incorporated in a pair of ordinary eyeglasses 10. The eyeglasses 10 are of the type which include a frame 12 having a center portion 14 and side portions 16 hinged at 18 to the center portion 14. The center portion 14 of the frame 12 holds a pair of lenses 20 formed of plastic or glass.

The lenses 20 have a coating or layer 22 of light blocking material such as black spray paint applied to the inner surface 24 thereof. The lenses 20 also have a coating or layer 26 of light relfecting material such as white spray paint applied to the outer surface 28 thereof. The combination of the coating or layer 22 of light blocking material and the coating or layer 26 of light reflecting material results in zero light transmission through the lenses 20 and thereby prevents eye strain.

In use, a person who is sunbathing wears the eyeglasses 10 in the well known manner so that the lenses 20 are disposed over the person's eyes. The coating or layer 22 of blocking material on the inner surface 24 of the lenses 20 will encourage the person's eyes to rest while the coating or layer 26 of light reflecting material on the outer surface 28 of the lenses 20 will prevent the eyeglasses 10 from heating up and becoming too uncomfortable to wear. With the eyeglasses 10 embodying the present invention, a person is thus able to sunbathe without the aggravation of ultraviolet rays which often penetrate ordinary sunglasses.

The present invention thus provides an eye shield that effectively blocks ultraviolet rays and that is particularly useful to people who sunbathe to prevent tearing of their eyes while also preventing headaches and wrinkling of the skin due to eye squinting.

While the preferred embodiment of the present invention has disclosed herein, it will be understood that the following claims also cover other embodiments and modifications of the present invention.

What is claimed is:

1. An eye shield for blocking ultraviolet rays, said eye shield being adapted for use in a pair of eyeglasses having a pair of lenses disposed to fit over the eyes of a person wearing the eyeglasses, said lenses each having an inner surface and an outer surface, the improvement comprising:

a coating or layer of light blocking material substantially covering the inner surfaces of said lenses;

a coating or layer of light reflecting material substantially covering the outer surfaces of said lenses; and wherein the combination of said coating or layer of light blocking material and said coating or layer of light reflecting material results in substantially zero light transmission through said lenses.

2. An eye shield according to claim 1, wherein said coating or layer of light blocking material is comprised of black paint, and wherein said coating or layer of light reflecting material is comprised of white paint.

3. An eye shield according to claim 1, wherein said lenses are formed of plastic.

4. An eye shield according to claim 1, wherein said lenses are formed of glass.

* * * * *